United States Patent [19]

Smith, Jr.

[11] 4,443,559

[45] * Apr. 17, 1984

[54] CATALYTIC DISTILLATION STRUCTURE

[75] Inventor: Lawrence A. Smith, Jr., Bellaire, Tex.

[73] Assignee: Chemical Research & Licensing Company, Houston, Tex.

[ * ] Notice: The portion of the term of this patent subsequent to Nov. 24, 1998 has been disclaimed.

[21] Appl. No.: 307,120

[22] Filed: Sep. 30, 1981

[51] Int. Cl.$^3$ .............................................. B01J 35/04
[52] U.S. Cl. ............................... 502/527; 203/DIG. 6
[58] Field of Search .............. 252/477 R; 203/DIG. 6

[56] References Cited

U.S. PATENT DOCUMENTS

| | | | |
|---|---|---|---|
| 2,403,672 | 7/1946 | Matuszak | 585/664 |
| 4,027,476 | 6/1977 | Schmidt | 252/477 R |
| 4,108,218 | 8/1978 | Estes et al. | 252/477 R |
| 4,215,011 | 7/1980 | Smith | 252/477 R |
| 4,302,356 | 11/1981 | Smith | 252/426 |
| 4,308,233 | 12/1981 | Narumiya et al. | 252/477 R |

*Primary Examiner*—W. J. Shine
*Attorney, Agent, or Firm*—Kenneth H. Johnson

[57] ABSTRACT

Catalytic distillation structure for use in reaction distillation columns, a providing reaction sites and distillation structure and consisting of a catalyst component and a resilient component intimately associated therewith. The resilient component has at least about 70 volume % open space and being present with the catalyst component in an amount such that the catalytic distillation structure consist of at least 10 volume % open space.

12 Claims, 10 Drawing Figures

CATALYTIC DISTILLATION STRUCTURE

The Government of the United States of America has certain rights in this invention pursuant to Contract No. DE-FC07-80CS40454 awarded by the U.S. Department of Energy.

BACKGROUND OF THE INVENTION

1. Field of the Invention

The present invention relates to structures which can be used in reactions wherein the reaction and distillation of the reaction system are carried on concurrently using the structures as both catalyst for the reaction and as distillation structures.

2. Related Art

U.S. Pat. No. 4,215,011 discloses a plurality of closed cloth pockets containing a particulate catalytic material arranged and supported by wire mesh. U.S. Pat. No. 4,250,052 discloses distillation packing structure consisting of a sulfonated cation resin.

U.S. Pat. Nos. 4,232,177 and 4,242,530 disclose the use of such structures for various catalytic reaction processes. U.S. Pat. No. 2,403,672 functionally states that the catalyst serves as the packing material in the column to fractionate the reaction products, however, no indication of the physical means to obtain this is disclosed.

SUMMARY OF THE INVENTION

The present invention provides catalytic distillation structures, which can be used as distillation structures. In order to serve both functions, it has been found that the structure must meet three criteria. First, the structure must be such as to provide for even spatial dispersement in the reactor distillation column. That is, the catalyst structures must rest in the column in a geometric arrangement which will perform the desired functions of reaction and distillation sites. To achieve this these structures must be such as to provide fairly uniform spatial distribution in the column.

A second criteria is that there must be sufficient free space in the catalyst bed to allow for the liquid phase surface contact and vapor phase distillation with the concurrent separation of the material in the column by the distillation into vapor and liquid phases. It has been observed that in the catalyst bed a free space of about 50 volume % is adequate to obtain an operatable fractionation.

A third criteria is the necessity for the catalyst bed to be able to expand and contract as it must during use without undue attrition of the catalyst.

These criteria have been met in the structures described and used in U.S. Pat. Nos. 4,242,530; 4,232,177; 4,250,052 and 4,215,011 described above. It has now been found that a suitable catalytic distillation component comprises a catalyst component intimately associated with or surrounded by a resilient component.

The catalyst component may take several forms. In the case of particulate catalytic material, generally from about 1 mm down through powders, is enclosed in a porous container such as cloth, screen wire or polymeric mesh or cloth. The material used to make the container must be inert to the reactants and conditions in the reaction system. The cloth may be any material which meets this requirement such as cotton, fiber glass, polyester, nylon and the like. The screen wire may be aluminum, steel, stainless steel and the like. The polymer mesh may be nylon, teflon or the like. The mesh or threads per inch of the material used to make the container is such that the catalyst is retained therein and will not pass through the openings in the material. Although the catalyst particles are generally in the range of 0.25 to 1 mm, particles of about 0.15 mm size or powders may be used and particles up to about ¼ inch diameter may be employed in the containers.

The container may have any configuration, such as the pockets disclosed in the commonly assigned patents of the present inventor noted above or the container may be a single cylinder, sphere, doughnut, cube, tube or the like.

Each container containing a solid catalytic material comprises a catalyst component. Each catalyst component is intimately associated with a resilient component which is comprised of at least 70 volume % open space up to about 95 volume % open space. The resilient component may comprise at least 70 volume % open space. The resilient component may comprise up to about 95 volume % open space. The combination of catalyst component and resilient component form the catalytic distillation structure. The total volume of open space for the catalytic distillation structure should be at least 10 volume % and preferably at least 20 volume % up to about 65 volume %. Thus, desirably the resilient material should comprise about 30 volume % of the catalytic distillation structure, preferably about 30 volume % to 70 volume %. One suitable such material is open mesh knitted stainless wire, known generally as demister wire or an expanded aluminum. Other resilient components may be similar open mesh knitted polymeric filaments of nylon, Teflon and the like. Other materials such as highly open structures foamed material, e.g., reticulated polyurethane may be formed in place or applied around the catalyst component.

In the case of larger catalyst components such as from about ¼ inch to ½ pellets, spheres, pills and the like, each such larger component may be individually intimately associated with or surrounded by the resilient component as described above.

It is not essential that the resilient component, entirely cover the catalyst component. It is only necessary that the resilient component intimately associated with the catalyst component will act to space the various catalyst components away from one another as described above. Thus, the resilient component provides in effect a matrix of substantially open space in which the catalyst components are randomly but substantially evenly distributed.

DETAILED DESCRIPTION AND PREFERRED EMBODIMENTS

Figure 1:
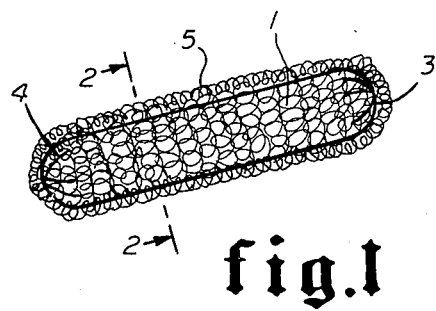
FIG. 1 is an elongated cylindrical embodiment of the present catalytic distillation structure.
Figure 2:
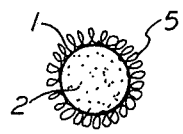
FIG. 2 is a cross section of FIG. 1 along line 2—2.

In the drawing, FIGS. 1 and 2 show an essentially cylindrical catalyst component 1 which may be formed of a cloth material, such as fiber glass and joined by sewing along a seam 2. The cylindrical shape is obtained by closing one end 3, e.g., by sewing, and loading the thus formed bag with particulate catalyst. The other end 4 is then closed, again by sewing for example, resulting in a sausage shaped catalyst component. About this is placed stainless steel demister wire 5 which is clamped together (not shown) and crimped over the ends.

Figure 3:
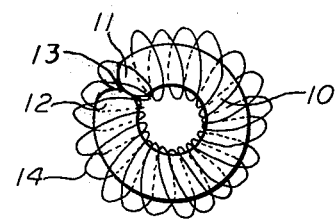
FIG. 3 is a doughnut configuration of the present catalytic distillation structure.
Figure 7:
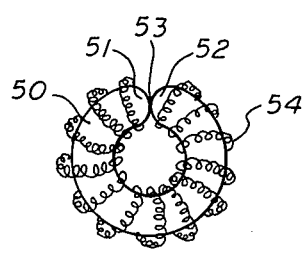
FIG. 7 is an alternate doughnut configuration of the present catalytic distillation structure.

FIGS. 3 and 7 show similar cylindrical shapes which can be joined at the ends to form doughnut like structures. In FIG. 3 the catalyst component 10 may be formed as that of FIG. 1 and the two ends 11 and 12 joined at 13 for example by a sewing or by a brad or other connecting means. The resilient member is comprised of open spaced material, e.g., stainless steel helical spring 14 with the individual loops of the spring each encircling the catalyst component.

FIG. 7 shows a cylindrically shaped catalyst component 50 with ends 51 and 52 joined at connection 53 as described for FIG. 3. The resilient member is a helical spring 54 wherein the loop of the spring is located about the surface of the cylinder and the spring 54 is wrapped around the cylinder.

Figure 4:
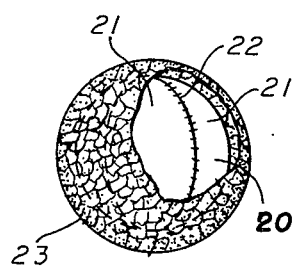
FIG. 4 is a spherical configuration of the present catalytic distillation structure.

FIG. 4 shows an embodiment wherein the catalyst component 20 is spherically shaped, formed by the joining of sections 21, by sewing for example. The catalyst particles are loaded into the sphere and an appropriate closure 22 made by sewing, brading, stapling or the like. The sphere is then enclosed with a reticulated foam material 23 by foaming, polyurethane for example, onto the sphere by such procedures as described in the prior art as found on pages 36 to 205 of "Plastic Engineering Handbook", 3rd edition, Reinhold Publishing Corp., N.Y. 1960, U.S. Pat. Nos. 3,165,483 and 3,171,820 or by inserting the sphere into previously formed discrete pieces of said foamed material. A portion of the foamed material has been cut away to show a portion of the sphere and the dotted lines show the remainder.

Figure 6:
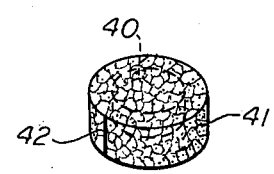
FIG. 6 is a tablet configuration of the present catalytic distillation structure.

The embodiment of FIG. 6 is similar to that of FIG. 4 except that the catalyst component is a discrete solid catalyst table 40 (shown by dotted lines) of about ½ diameter, which has been inserted in the reticulated foam 41 through slit 42.

Figure 5:
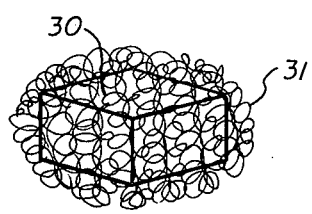
FIG. 5 is a rectangular configuration of the present catalytic distillation structure.

FIG. 5 shows a six sided structure (a rectangular parallelopiped 30 or cube which would be a shape easily made of wire mesh wherein the joints are welded or otherwise adhered together with the particulated catalyst inside. A demister wire 31 is wound around the structure and crimped on two sides.

Figure 8:
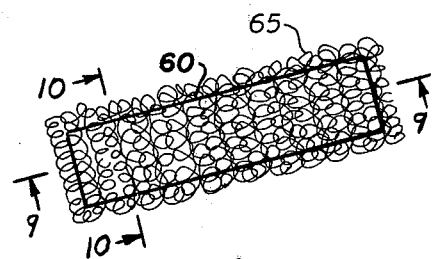
FIG. 8 is a packet configuration of the present catalytic distillation structure.
Figure 9:
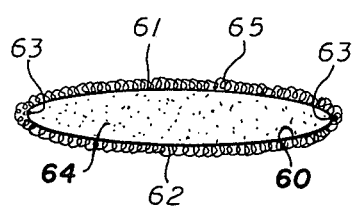
FIG. 9 is a cross section of FIG. 8 along line 9—9.
Figure 10:
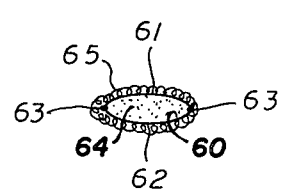
FIG. 10 is a cross section of FIG. 8 along line 10—10.

FIGS. 8, 9 and 10 show another embodiment particularly suited to the use of wire mesh. The catalyst component 60 is comprised of two sides 61 and 62 which are joined, e.g., by welding, along all four edges, thereby forming a pouch. The welds are shown by 63 and particulate catalyst material 64 is contained within the pouch thus formed. Demister wire 65 is wrapped about the pouch preferably around the long axis and closed by appropriate means, such as stapling or crimping.

In place of the wire mesh and metal springs, equivalent materials made from polymers may be used. In place of welds or sewn seams, adhesives may be used, with the only proviso being that the materials employed withstand attack by the materials and conditions in the reactor distillation column.

The catalytic distillation structures, as described and shown, when placed in the reactor distillation column will by virtue of the resilient component cause the catalyst components to be evenly distributed through the area provided. Usually there will be provided support means along the column with beds of the present catalytic distillation structures thereon similar to seive trays with some space between the trays, although long continuous beds may be employed.

The size of catalyst components and the relative amount of the resilient component associated therewith or surrounding the catalyst components will determine the open space in the bed, which should be at least about 10 volume % and preferably at least 20 volume %. In the case of longer beds, it may be desirable to have a larger open space, thus a larger volume of the resilient material compared to the catalyst component would be employed.

The catalyst material can be any solid material which serves as a catalyst for the reaction to be carried out. Although the present catalytic distillation structures are especially useful for process where there is a concurrent reaction distillation, it is also very useful for vapor phase reactions, since the catalyst bed prepared from the present structures provides a very low pressure drop therethrough.

The catalytic material may be any material, appropriate for the reaction at hand, that is, it may be an acid catalyst or a basic catalyst or others such as catalytic metals and their oxides or halides, suitable for a multitude of catalytic reactions and, of course, heterogeneous with the reaction or other fluids in the system. Some specific catalyst and reactions are:

| Catalyst | Reaction |
| --- | --- |
| Acid cation exchange resins | dimerization, polymerization, etherification, esterification, isomerization, alkylation |
| Magnesia, chomia, brucite | isomerization |
| Molecular sieves (synthetic alumino-silicates) | dimerization, polymerization, alkylation, isomerization, selective hydrogenation, dehydrogenation |
| Cobalt thoria | Fisher-Tropsch process |
| Aluminum chloride | Friedel-Crafts reaction |
| Cobalt molybdate | hydrofining |

The material for forming the catalytic component may be cloth, e.g., cotton, linen, fiber glass, or Teflon (polytetrafluoroethylene) although fiber glass and Teflon are preferred because of their resistance to chemical attack. The wire mesh materials used may be stainless steel, expanded aluminium, or the like. The cloth is conveniently joined by sewing with fiber glass or Teflon yarn, which may also be employed with the wires. Suitable adhesives such as epoxys or various of the hot melt adhesives which are not softened at the temperatures of use or attacked by the reactants or products may be used to join both cloth and wire into the appropriate configuration. Similarly staples, brads or other fastening means may be used. The wire may be sealed by welding. In a similar fashion, seals may be obtained with laser welding on the meltable materials.

In some of the configurations, such as cylinders the container may be produced as a tube requiring only closure of the two ends.

The individual catalytic distillation structures can vary in size from about ½ inch to one foot, e.g., a ¼ tablet may be incased in ½ ball of demister wire or a ¼ inch cloth tube containing granular resin beads, one foot long may be incased in ½ layer of demister wire.

The individual catalytic distillation structures may be individually and randomly placed into a reactor distillation column or arranged in specific patterns or groupings. Moreover, any catalyst bed may be a mixture of various shapes and sizes of the present catalytic distillation structures.

The invention claimed is:

1. A catalytic distillation structure comprising a catalyst component intimately associated with or surrounded by a resilient component, which is comprised of at least 70 volume % open space for providing a matrix of substantially open space.

2. The catalytic distillation structure according to claim 1 wherein said resilient component is comprised of up to about 95 volume % open space.

3. The catalytic distillation structure according to claim 1 wherein said resilient component comprises 30 to 70 volume % of said catalytic distillation 4. The catalytic distillation structure according to claim 1, 2 or 3 wherein said catalyst component comprises a container containing a solid particulate catalytic material.

5. The catalytic distillation structure according to claim 4 wherein said container is porous.

6. The catalytic distillation structure according to claim 5 wherein said container is made of cotton cloth, fiber glass cloth, polymeric cloth, polymeric mesh, stainless steel screen wire or aluminum screen wire.

7. The catalytic distillation structure according to claim 5 wherein said catalytic material particle size is in the range of from about 0.15; mm to about ¼ inch.

8. The catalytic distillation structure according to claim 7 wherein the particle size is in the range of from about 0.25 mm to 1 mm.

9. The catalytic distillation structure according to claim 1, 2 or 3 wherein said catalyst component comprises a discrete structure comprising catalytic material and being from about ¼ to ½ inch in diameter.

10. The catalytic distillation structure according to claim 9 wherein said catalyst component is a tablet.

11. The catalytic distillation structure according to claim 1 containing from about 10 to 65 volume % open space.

12. The catalytic distillation structure according to claim 1 wherein said catalyst component is surrounded by said resilient component.

* * * * *